(12) United States Patent
Takeshita et al.

(10) Patent No.: US 7,773,641 B2
(45) Date of Patent: Aug. 10, 2010

(54) OPTICALLY PUMPED DISK-TYPE SOLID STATE LASER OSCILLATOR AND OPTICALLY PUMPED DISK-TYPE SOLID STATE LASER SYSTEM

(75) Inventors: Kenji Takeshita, Aichi-chen (JP); Shinya Ishii, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 9 days.

(21) Appl. No.: 12/003,178

(22) Filed: Dec. 20, 2007

(65) Prior Publication Data

US 2009/0161702 A1    Jun. 25, 2009

(51) Int. Cl.
*H01S 3/30* (2006.01)
*H01S 3/07* (2006.01)
*H01S 3/08* (2006.01)

(52) U.S. Cl. .............................. 372/7; 372/67; 372/99

(58) Field of Classification Search ............ 372/66, 372/67, 7, 92, 94, 99
See application file for complete search history.

(56) References Cited

U.S. PATENT DOCUMENTS

| 3,241,085 A | * | 3/1966 | Marcatili | 372/94 |
| 3,950,712 A | * | 4/1976 | Chenausky et al. | 372/95 |
| 4,780,882 A | * | 10/1988 | Nir | 372/95 |
| 5,414,724 A | * | 5/1995 | Zhou et al. | 372/10 |

FOREIGN PATENT DOCUMENTS

| JP | 2004-521490 | 7/2004 |
| JP | 2004-349701 | 12/2004 |

OTHER PUBLICATIONS

W. Koechner, Springer, "Solid State Laser Engineering 5$^{th}$ Edition", 1999, pp. 447-463.

* cited by examiner

*Primary Examiner*—Armando Rodriguez
(74) *Attorney, Agent, or Firm*—Wenderoth, Lind & Ponack, L.L.P.

(57) ABSTRACT

An optically pumped disk type solid state laser oscillator includes: a cylindrical shape thin film laser gain medium having a through-hole; a ring mirror whose surface is opposing to a side surface of the thin film laser gain medium; a conical mirror arranged in the through-hole and reflects a light from the ring mirror to a direction perpendicular to the thin film laser gain medium where an output mirror is arranged. The ring mirror, the conical mirror and the output mirror compose a resonator for oscillating a laser beam to be outputted from the output mirror.

6 Claims, 7 Drawing Sheets

INCIDENT LIGHT
(FREQUENCY $\nu$)

$E1-E0=h\nu$

SPONTANEOUS EMISSION
(FREQUENCY $\nu$)

$E1-E0=h\nu$

INCIDENT LIGHT
(FREQUENCY $\nu$)

INDUCED EMISSION
(FREQUENCY $\nu$)

$2 \times (E1-E0)$

OPTICALLY PUMPED DISK-TYPE SOLID STATE LASER OSCILLATOR AND OPTICALLY PUMPED DISK-TYPE SOLID STATE LASER SYSTEM

BACKGROUND OF THE INVENTION

1. Field of the Invention

The present invention relates to an optically pumped disk-type solid state laser oscillator that oscillates a laser beam by a light energy supplied from the outside and an optically pumped disk-type solid state laser system.

2. Description of Related Art

Figure 1:
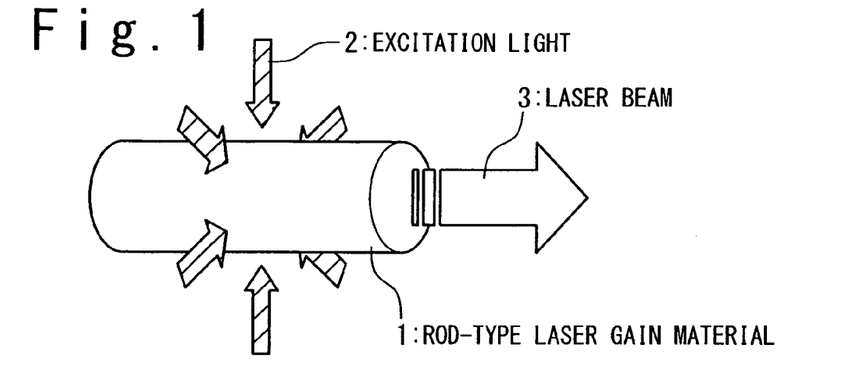
FIG. 1 is a diagram showing an outline configuration of a conventional rod-type solid state laser oscillator.

In a laser beam output by the solid state laser system, exhausting of heat generated in the interior of the solid state laser medium (laser gain material) poses a large problem. FIG. 1 shows an outline configuration of a conventional rod-type solid state laser system. In the rod-type solid state laser system shown in FIG. 1, when excitation light 2 is irradiated on a rod-type laser gain material 1 and the rod-type laser gain material 1 outputs a laser beam 3 in its axial direction, a thermal gradient generated in the interior of the rod-type laser gain material 1 causes a quality degradation of the laser beam 3, such as an output power decrease of the outputted laser beam 3, and breakage of the rod-type laser gain material 1 self.

Because of this problem, as a method for decreasing the temperature gradient in the rod-type laser gain material, a disk-type solid state laser system in which the laser gain material is formed to be a thin film (made into a disk) in its axial direction was devised. Formation of the laser gain material into a disk shape makes it possible to enlarge a light receiving plane of the excitation light irradiated from the outside and the whole surface of the disk is uniformly cooled, which enables the temperature gradient in the laser gain material to be suppressed. The disk-type solid state laser system is broadly divided into a transmission type system (FIG. 2) and a reflection type system (FIG. 3) in terms of a method for amplifying laser light.

Figure 2:
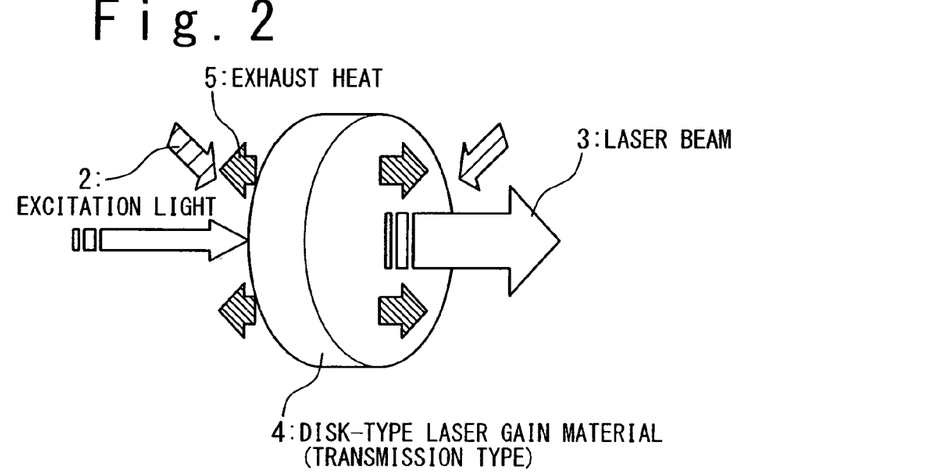
FIG. 2 is a diagram showing an outline configuration of a conventional disk-type solid state laser oscillator of a transmission system.

As shown in FIG. 2, in a transmission-type disk-type solid state laser system, in order to cancel a temperature rise and the temperature gradient inside the laser gain material 4 resulting from irradiation of the excitation light 2 on the thin film disk-type laser gain material (transmission type) 4 from the outside, usually, the heat in the interior of the gain material is exhausted (5) to the outside by cooling parallel planes (disk planes) of the thin film disk-type laser gain material (transmission type) 4 from both sides thereof with a cooling medium. However, the laser beam 3 generated inside the thin film disk-type laser gain material (transmission type) 4 also passes through the cooling medium simultaneously. Because of this, distortion occurs in the laser beam 3 passing through the cooling medium and an operational limitation (for example, the cooling medium supply is stopped during laser oscillation) arises.

Figure 3:
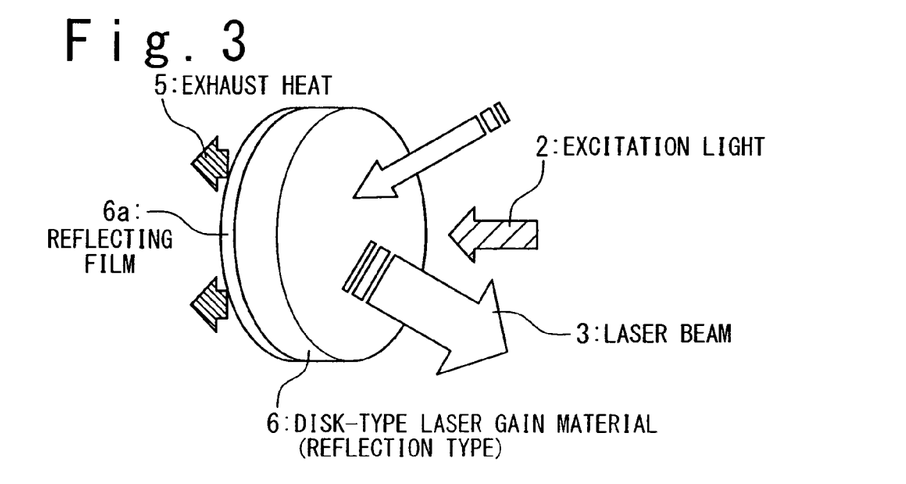
FIG. 3 is a diagram showing an outline configuration of a conventional disk-type solid state laser oscillator of a reflection system.

On the other hand, in the reflection-type disk-type solid state laser system shown in FIG. 3, a reflecting film 6a is joined together to one of parallel planes of a thin film disk-type laser gain material (reflection type) 6. By this arrangement, when the excitation light 2 is irradiated on a parallel plane of the thin film disk-type laser gain material (reflection type) 6 to which the reflecting film 6a is not joined, the laser beam 3 is outputted from a surface of the parallel plane. By providing a cooling mechanism that exhausts heat from the whole parallel plane to which the reflecting film 6a is joined, the heat 5 accumulated in the interior of the thin film disk-type laser gain material (reflection type) 6 can be exhausted to the outside effectively.

In the present embodiment, it becomes possible for the resonator to output the laser beam 3 from the parallel plane to which the reflecting film 6a is not joined, without being affected by the cooling mechanism. Thus, in the reflection-type disk-type solid state laser system, as compared to the transmission-type, since the excitation light 2 is irradiated on the plane to which the reflecting film 6a of the thin film disk-type laser gain material (reflection type) 6 is not joined and is reflected by an inner surface of the reflecting film 6a that is joined on an opposite plane, a distance of an optical path of the excitation light 2 that propagates inside the thin film disk-type laser gain material (reflection type) 6 is increased by a thickness of the thin film disk-type laser gain material (reflection type) 6, and the laser beam 3 is amplified additionally by the amount of the optical path increase effected by the excitation light 2. Thus, even if the laser has the thin film disk-type laser gain material of the identical shape, the refection type laser has an advantage of capability of outputting the laser beam 3 with a large amplification degree as compared to that of the transmission type.

However, also in the case of the reflection-type disk-type solid state laser system, the excitation light 2 can enter only one parallel plane of the thin film disk-type laser gain material, and there remains an effect of the temperature gradient inside the thin film disk-type laser gain material. Moreover, since both systems use stimulated emission in a disk thickness direction (axial direction) that delivers a small gain, not using laser oscillation based on stimulated emission in a disk radial direction that delivers a large gain, it is difficult for a single disk to output the laser beam 3 with a large gain.

On the other hand, it is difficult to use the laser oscillation based on the stimulated emission in the disk radial direction having the large gain because of the shape of the thin film disk-type laser gain material. Moreover, the stimulated emission in the disk radial direction having the large gain affects stimulated emission in the disk thickness direction that contributes to actual laser oscillation, lowering the efficiency of stimulated emission in the disk thickness direction.

A report as shown below has been made in relation to the above-mentioned technique.

"Diode pumped solid state disk laser and method for generating uniform laser gain" disclosed in Japanese Laid-Open Patent Application JP-P2004-349701A proposes an amplification module for sold-state laser that substantially includes a disk having two substantially parallel surfaces and an outer circumferential portion and including an optical gain material, and a plurality of diode bars that are arranged to encircle the outer circumferential portion of the disk and are configured to give an optical pump irradiation to an optical gain material, wherein each of the plurality of diode bars is aligned spatially with respect to the disk so as to generate a substantially uniform gain across the optical gain material.

Furthermore, a "side-face pumped active mirror solid state laser for high output" disclosed in Japanese Laid-Open Patent Application JP-P2004-521490A is a solid sate laser module for amplifying laser irradiation that substantially includes:

a substrate including a surface on which a plurality of channels are formed; and a laser grain medium having a front surface, a back surface, and a peripheral edge surface, the back surface contacting the surface of the substrate, wherein the solid state laser module further includes a non-doped optical medium that is attached to the peripheral edge, and an optical pumping irradiation source, the source directs optical pumping irradiation to the non-doped optical medium, the non-doped optical medium transfers the optical pumping irradiation to the laser gain medium; and the channel is maintained at a low pressure so that a difference of pressure is formed between the front surface of the laser gain medium and the back surface of the laser gain medium and the laser gain medium is fixed on the substrate to get along with it.

Still furthermore, "Solid state Laser Engineering 5th Edition" (W. Koechner, Springer, 1999, pp 447-463) illustrates, as an "active mirror amplifier," a reflection-type disk-type solid state laser system is configured such that a reflecting film is coated on one of parallel planes of a thin film disk-type laser medium and excitation light is irradiated on the same disk plane as is coated with the reflecting film, and illustrates, as a "disk amplifier," a laser system such that gain is improved by using a plurality of disk-type solid state laser mediums arranged serially in a transmission-type disk-type solid state laser system described in this specification.

SUMMARY

The object of the present invention is to provide an optically pumped disk-type solid state laser oscillator and an optically pumped disk-type solid state laser system that can output a high-quality and high-power laser beam.

According to an aspect of the present invention, an optically pumped disk type solid state laser oscillator includes: a thin film laser gain medium formed in a cylindrical form and configured to generate a stimulated emission in response to an inputted excitation light and having a through-hole in a central area of the thin film laser gain medium and being formed in a cylindrical form; a ring mirror having a ring form whose central axis is same to a central axis of the thin film laser gain medium and configured to have a mirror surface opposing to a side surface of the thin film laser gain medium; a conical mirror whose central axis is same to the central axis of the thin film laser gain medium and arranged in the through-hole; and an output mirror arranged on an extension of the central axis and whose mirror surface and the conical mirror are opposingly faced to each other.

According to another aspect of the present invention, an optically pumped disk type solid state laser system includes: the optically pumped disk type solid state laser oscillator according to the present invention; an incident optical system configured to introduce the excitation light into an incident surface of the thin film laser gain medium arranged in a same side with the output mirror; and a heat sink thermally connected to an opposite surface of the incident surface of the thin film laser gain medium.

According to further another aspect of the present invention, an adjusting method of a laser oscillation mode of the optical disk type solid state laser oscillator according to the present invention includes: optimizing to limit a laser oscillation mode outputted from the output mirror to at least one low-order Laguerre-Gaussian mode, and the optimizing includes: optimizing a curvature of the ring mirror; optimizing a curvature of the conical mirror; optimizing a curvature of the output mirror; and optimizing a relative position of the conical mirror to the thin film laser gain medium in a direction of the central axis of the thin film laser gain medium.

According to further another aspect of the present invention, an optically pumped disk type solid state laser oscillator includes: a thin film laser gain medium configured to generate a stimulated emission in response to an irradiated excitation light, and having a through-hole of cylindrical shape, and a radial direction laser oscillating section configured to resonate a radial component of the stimulated emission generated in the thin film laser gain medium, wherein the radial component is a component directed in a perpendicular direction to a thickness direction of the thin film laser gain medium.

According to the present invention, an optically pumped disk-type solid state laser oscillator and optically pumped disk-type solid state laser system that can output high-quality and high-output laser beam can be provided.

DETAILED DESCRIPTION OF PREFERRED EMBODIMENTS

Hereafter, referring to the accompanying drawings, best modes for carrying out an optically pumped disk-type solid state laser oscillator and an optically pumped disk-type solid state laser system according to the present invention will be described.

First, as a general outline description of the laser oscillation of the present invention, two points will be described, i.e., a principle that light is stimulated and emitted in a medium by irradiating excitation light on a disk-type solid state laser gain medium, and a mechanism whereby light being stimulated and emitted is oscillated by a resonator to output to the outside of the disk-type solid state laser gain medium as a laser beam.

Figure 4:
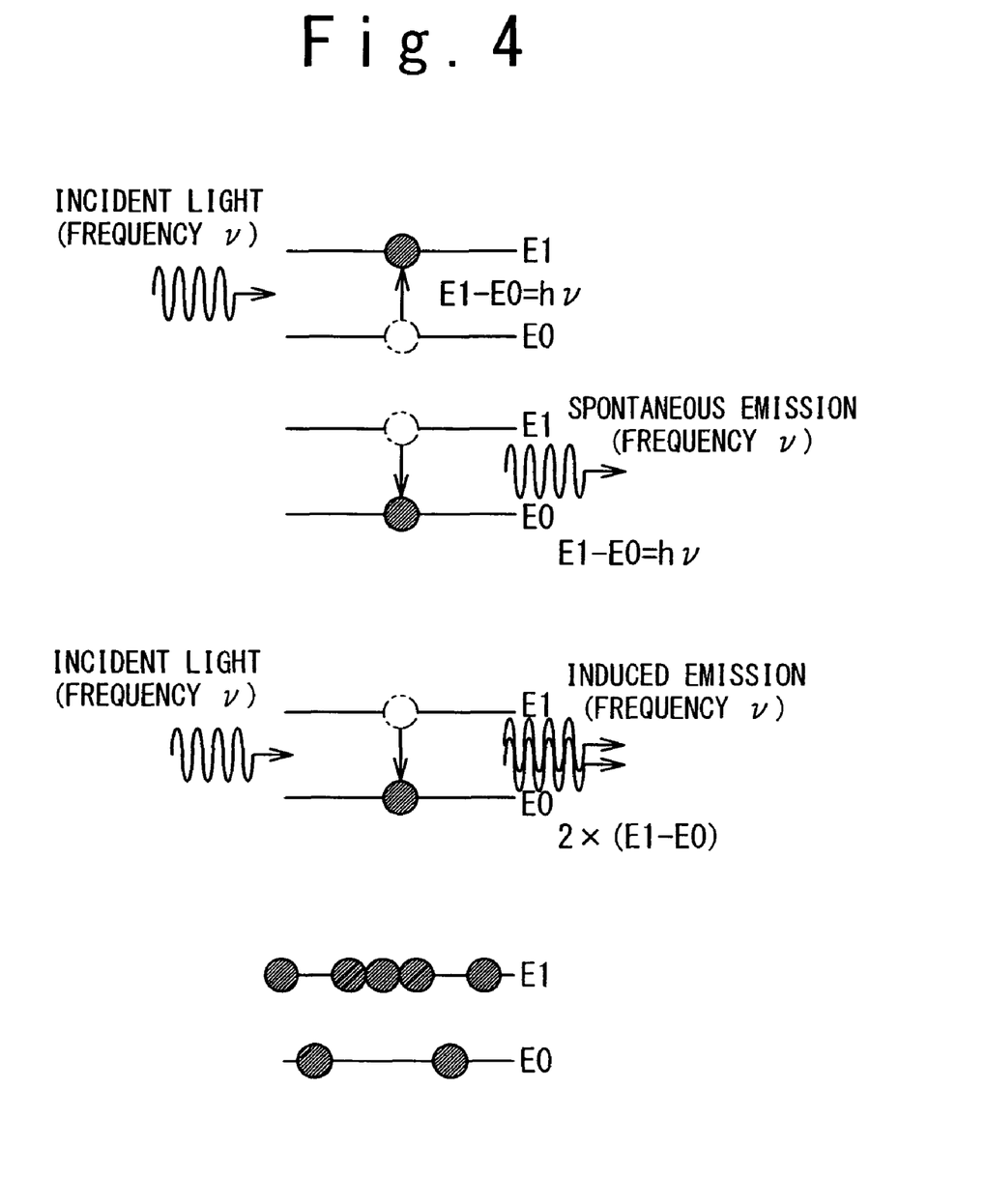
FIG. 4 is a diagram showing a schematic drawing of population inversion in a laser gain medium, and laser oscillation.

As shown in FIG. 4, when the excitation light enters into the inside of the laser medium, the laser medium is excited to a state whose energy is higher by an energy (E=hv) equal to the energy of the excitation light. The matter in an excitation state returns to its stable state (ground state) after a certain time (E1→E0), and at this transition, the matter emits light whose frequency is equivalent to an energy difference (E1−E0) between the excitation state and the stable state. This phenomena termed spontaneous emission (meaning that the matter spontaneously emits light not based on light from the outside).

If the laser medium is in the excitation state E1 and light having an energy (E1−E0) enters there from the outside, the laser medium emits light that has the same energy (E1–E0), the same phase, and the same direction as those of the entered light. This phenomena is termed induced emission or stimulated emission of light. Since the stimulated emission light is identical to the entered light in energy (E1–E0), phase, and direction, high-intensity light can be obtained by allowing the stimulated emission to repeat by a plurality of times.

When the stimulated emission is repeated by the resonator, population inversion state is realized. In the population inversion state, a portion of the matter in the high-energy excitation state is more than a portion of the matter in the stable state. In the population invention state, the stimulated emission is generated more frequently than spontaneous emission.

Figure 5:
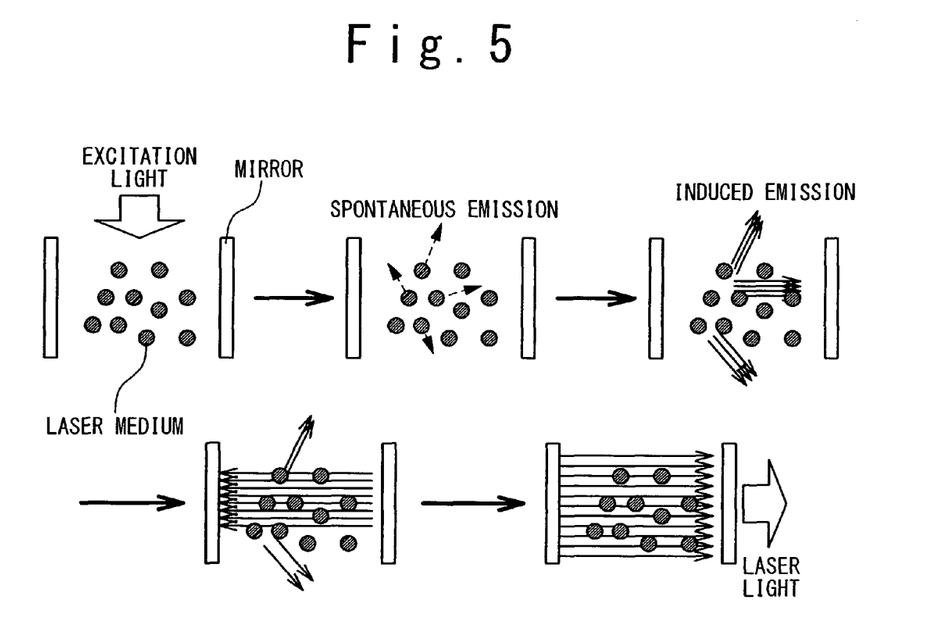
FIG. 5 is a diagram showing a schematic drawing of the population inversion in a laser gain medium, and laser oscillation.

FIG. 5 shows a schematic drawing of the laser oscillation based on the stimulated emission. In laser oscillation, the population inversion is generated in the matter by the excitation light from the outside, and particularly by means of a resonator (a laser gain medium is sandwiched between mirrors) using only the stimulated emission in a certain one direction (a direction of resonance in the resonator) among all stimulated emission lights occurring at random. The laser oscillating light whose intensity exceeds a certain threshold is outputted to the outside of the laser gain medium as a laser beam.

The optically pumped disk-type solid state laser resonator and the optically pumped disk-type solid state laser system of the present embodiment feature as follows.

(1) In the disk-type solid state laser gain medium for oscillating a laser beam by being irradiated by the excitation light, it is equipped with a resonance mechanism for employing propagation and amplification in a disk radial direction that enables light of stimulated emission to obtain a large gain.

(2) In the disk-type solid state laser gain medium, the excitation light is entered from the front surface of the disk, and the stimulated emission propagates in the medium in the disk radial direction by total reflection. The thermal strain generated in the disk in the thickness direction of the disk (the disk axial direction) is suppressed, and a high-quality laser beam is oscillated.

(3) In a resonator constructed with a ring (toroidal-type) mirror disposed to oppose the outer circumferential portion of the disk-type solid state laser gain medium, a conical mirror disposed in a penetration through part provided on the central axis of the disk-type solid state laser gain medium, and an output mirror, by adjusting in such way that a curvature of each mirror may be optimized and a relative position in the central axis direction of the conical mirror with respect to the thin film disk-type laser gain medium may be optimized, an oscillation mode of the outputted laser beam is limited to low-order Laguerre-Gaussian mode(s), so that a high-quality laser beam is made to oscillate. Moreover, the disk is provided with a heat radiating mechanism for exhausting heat generated in the interior of the disk-type solid state laser gain medium to the outside on its back surface, whereby it becomes possible to oscillate a high-quality laser beam and at the same time to realize highly reliable optically pumped disk-type solid state laser system.

First Embodiment

Optically Pumped Disk-Type Solid State Laser Resonator

Figure 6:
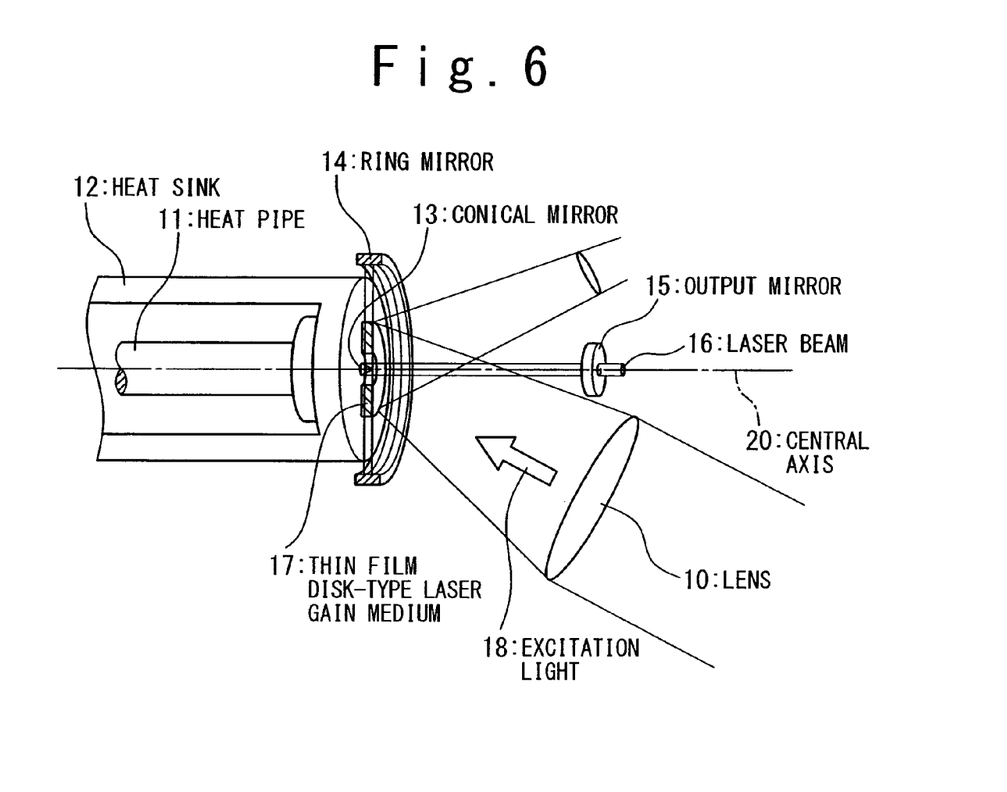
FIG. 6 is a diagram showing an outline configuration of an optically pumped disk-type solid state laser oscillator and an optically pumped disk-type solid state laser system according to an embodiment of the present invention.

FIG. 6 shows an outline configuration of an optically pumped disk-type solid state laser resonator according to an embodiment of the present invention. The optically pumped disk-type solid state laser oscillator according to the present embodiment has a thin film disk-type laser gain medium 17 that generates stimulated emission in the interior thereof by irradiated excitation light 18 and has a penetration through part in a shape of a circular cylinder along the central axis 20, a ring mirror (toroidal mirror) 14 that has the same central axis as the central axis 20 of the thin film disk-type laser gain medium 17 and is disposed to oppose the outer circumferential portion of the thin film disk-type laser gain medium, a conical mirror 13 that has the same central axis as the central axis of the thin film disk-type laser gain medium 17, and is disposed inside a penetration through part of the thin film disk-type laser gain medium, an output mirror 15 that has the same central axis as the central axis of the thin film disk-type laser gain medium, and is disposed on a slanting mirror surface 13a (which is conically shaped) side of the conical mirror.

As materials provided for forming the thin film disk-type laser gain medium 17, the following are used:

(1) Nd, Cr-doped YAG (Y3Al5O12; yttrium, aluminum, garnet), (2) Nd, Cr-doped GSGG (Gd3Sc2Al3O12; gadolinium, scandium, aluminum, garnet); and (3) Nd, HO-doped alexandrite (Cr-doped BeAl2O4), etc.

Operation Principle of First Embodiment

When the excitation light 18 enters on one of the disk surfaces of the thin film disk-type laser gain medium 17 that is provided in the optically pumped disk-type solid state laser resonator of the present embodiment from its axis direction, a population inversion will arise inside the medium. In the present embodiment, as shown in FIG. 4, the resonance mechanism is constructed with the ring mirror (toroidal mirror) 14 installed to oppose the outer circumferential portion of the thin film disk-type laser gain medium 17 through the conical mirror 13 disposed inside the penetration through part provided in the center of the thin film disk-type laser gain medium 17, and the output mirror 15 installed on a side on which the excitation light 18 on the central axis of the thin film disk-type laser gain medium 17 and the conical mirror 13 enters. That is, only stimulated emission in the radial direction among all portions of stimulated emission generated in the interior of the thin film disk-type laser gain medium 17 is repeatedly excited by the above-mentioned resonance mechanism, and finally the laser light exceeding a certain threshold intensity is outputted to the outside through the output mirror 15.

Figure 7:
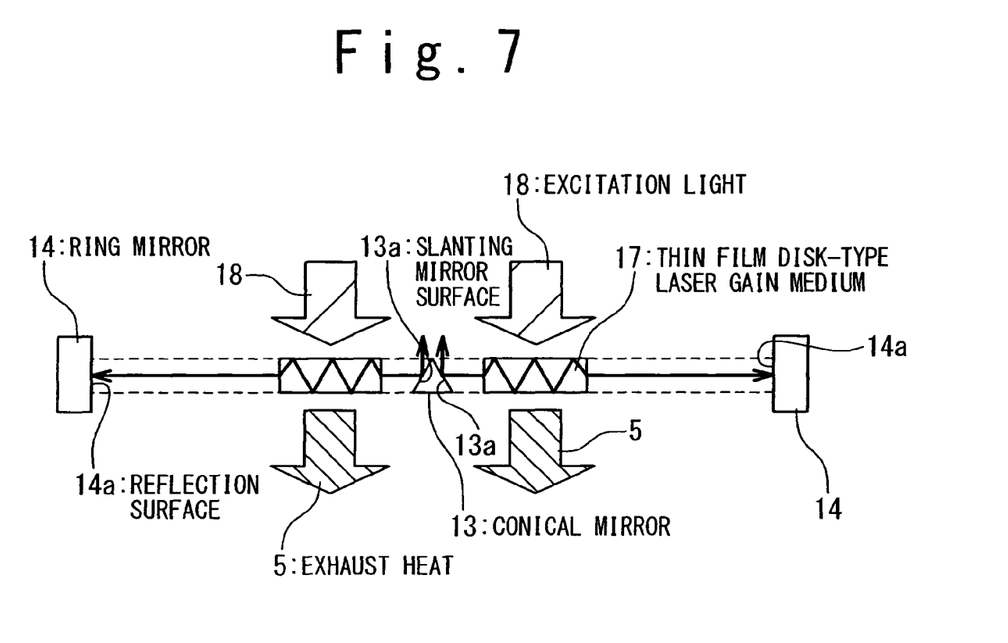
FIG. 7 is a diagram showing a schematic drawing of total reflection propagation of stimulated emission in radial direction in a thin film disk-type laser gain medium according to the present embodiment.

FIG. 7 shows a schematic drawing of total reflection propagation of stimulated emission in the radial direction in the thin film disk-type laser gain medium 17 according to the present embodiment. When the excitation light 18 enters on one disk surface of the laser gain medium 17 from an axial direction, stimulated emission will arise in the interior of the laser gain medium 17. A component of this stimulated emission in the radial direction is gradually amplified by the resonance between a reflection surface 14a of the ring mirror (toroidal mirror) 14 and the output mirror 15, which constitute the resonance mechanism of the present embodiment, through the slanting mirror surface 13a of the conical mirror 13. Then, light having an intensity exceeding a certain threshold at the output mirror 15 is outputted as a laser beam.

Particularly, in the present embodiment, a laser resonator is constructed using stimulated emission in the radial direction of the thin film disk-type laser gain medium 17 that acts as a laser gain material. By this arrangement, stimulated emission propagating in the disk radial direction propagates and travels in the radial direction by repeating reflection between the two surfaces of the disk. Because of this, the thermal gradient in a disk thickness direction (central axis direction) is suppressed. Moreover, the stimulated emission in the disk radial direction of high gain is used for laser oscillation. By this configuration, a laser beam with high beam quality and high power can be made to oscillate.

Figure 8A:
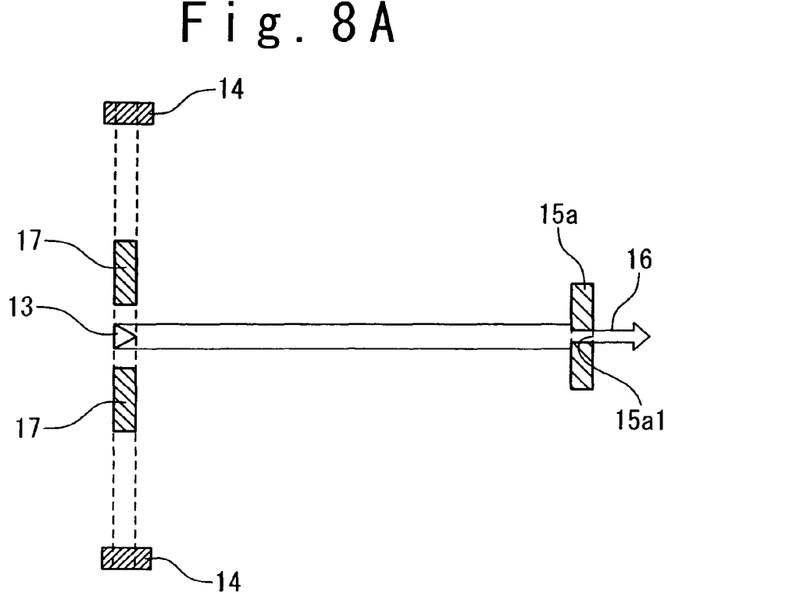
FIG. 8A is a diagram showing an output mirror of a coupling output system according to the present embodiment.
Figure 8B:
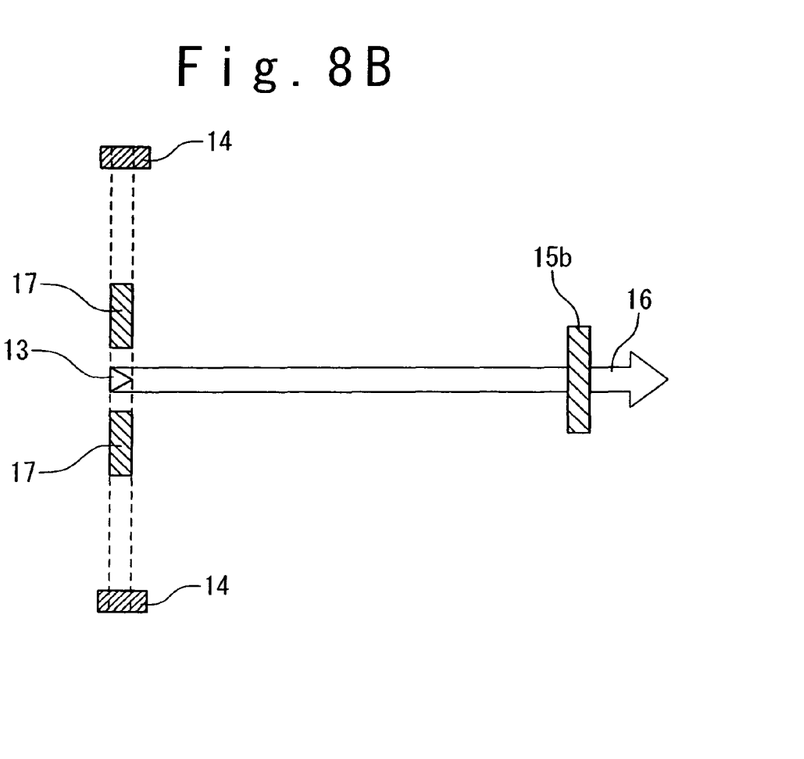
FIG. 8B is a diagram showing an output mirror of a half mirror-type output system according to the present embodiment.
Figure 8C:
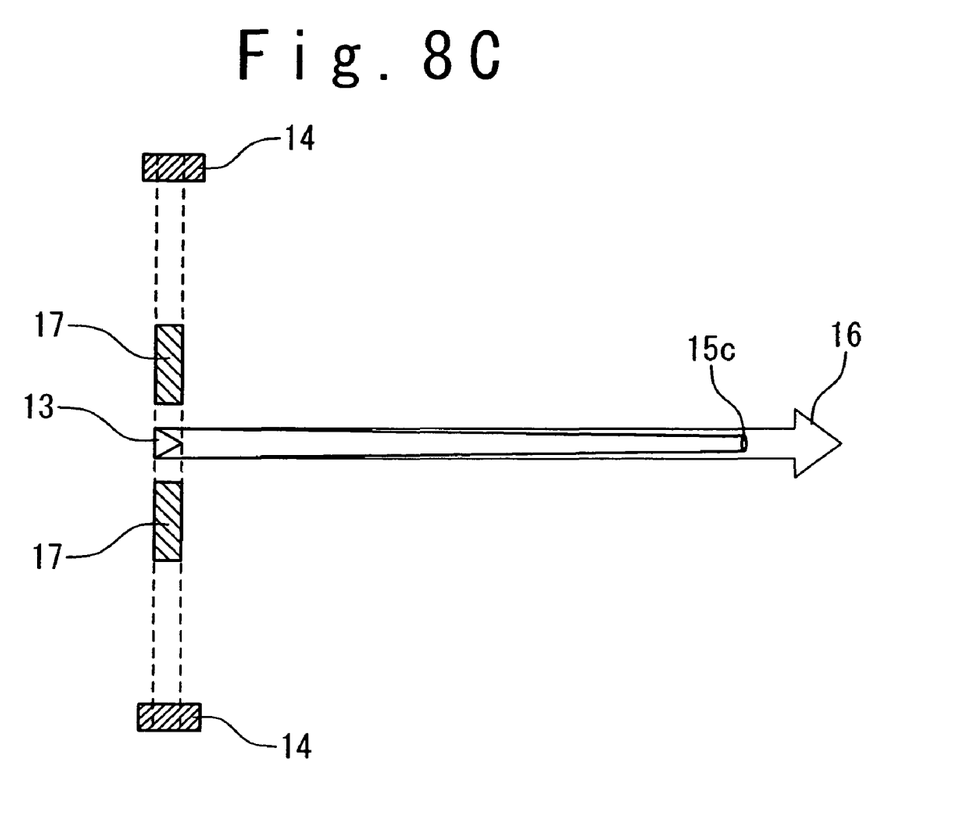
FIG. 8C is a diagram showing an output mirror of the unstable resonator system with a convex-type output mirror according to the present embodiment.

As the output mirror 15 concerning the present embodiment, forms as shown in FIGS. 8A to 8C are applied. The output mirror 15a shown in FIG. 8A is one that is of a coupling hole output system, wherein an central axis of an output mirror 15a agrees with a central axis of the laser gain medium 17 and the conical mirror 13, and a coupling hole 15a1 whose hole diameter is smaller than the diameter of the output mirror 15 is provided on that axis. Then, in a case where this output mirror 15a is applied, stimulated emission repeats reflection in a mirror part of the output mirror 15a, and when the laser oscillation exceeds a certain intensity (threshold) by repeating reflection, the laser light is outputted to the outside through the coupling hole 15a1.

An output mirror 15b shown in FIG. 8B is of a half mirror type output system, which reflects only a part of a specified ratio of stimulated emission reflected by the conical mirror 13 and allows the remainder to pass therethrough, outputting to the outside of the resonator as a laser beam 16. When this output mirror 15b is applied, regarding stimulated emission, a portion of stimulated emission of a specified ratio that is reflected by the output mirror 15b is amplified by being repeatedly reflected by the resonance mechanism, and is finally outputted to the outside as the laser beam 16 after passing through the output mirror 15b.

An output mirror 15c shown in FIG. 8C is of an unstable type resonance system with a convex type output mirror, and a diameter of the convex type output mirror is smaller than a beam diameter of stimulated emission coming from the conical mirror 13 by reflection. For this reason, among stimulated emission being reflected by the conical mirror 13, a portion that is equivalent to the diameter of the convex type output mirror is reflected by the convex type output mirror and the remainder of the beam is directly outputted as a laser beam 16 to the outside of the resonator. In a case where this output mirror 15c is applied, regarding stimulated emission, stimulated emission reflected by the convex type output mirror is amplified by repeated reflection in the resonance mechanism, and finally is outputted as the laser beam 16 passing through the output mirror 15c.

Still moreover, in the present embodiment, a combination of the curvature of the reflection surface 14a of the ring mirror 14, the curvature of the slanting mirror surface 13a of the conical mirror 13, and the curvature of a mirror surface of the output mirror 15 is optimized and a relative position of the conical mirror in the central axis direction with respect to the thin film disk-type laser gain medium is optimized, whereby a laser oscillation mode of the laser beam 16 outputted from the output mirror 15 to the outside can be limited to a lower-order Laguerre-Gaussian mode(s), and accordingly an output of high-quality laser beam becomes possible.

As described above, in the present embodiment, the optically pumped disk-type solid state laser resonator has a configuration such that the made-up resonator continues amplification while maintaining directivity in the disk radial direction, and at a time when the laser output exceeds a certain threshold, oscillates the laser beam 16 to the outside of the resonator. By this configuration, light propagating in the disk radial direction in which the light can receive a maximum gain among stimulated emission generated in random directions by the population inversion generated in the interior of the thin film disk-type laser gain medium 17 can be used. By this mechanism, the optically pumped disk-type solid state laser resonator capable of outputting an extremely high-power laser beam can be realized.

Furthermore, in the present embodiment, thanks to a special resonator constructed with the ring mirror 14, the conical mirror 13, and the output mirror 15, by using stimulated emission in the disk radial direction for laser oscillation in the disk that acts as the laser gain material, it becomes possible to suppress an effect of thermal strain generated in the axial direction (in the disk thickness direction) of the thin film disk-type laser gain medium 17 by the excitation light 18 being made to enter from the disk front plane. By this capability, it becomes possible to effectively suppress the influence of the thermal strain on the laser beam (degradation of beam quality, lowering of beam output power).

Still furthermore, in the present embodiment, a combination including the curvature of the reflection surface 14a of the ring mirror 14, the curvature of the slanting mirror surface 13a of the conical mirror 14, and the curvature of a surface of the output mirror 15 is optimized and a relative position of the conical mirror in the central axis direction with respect to the thin film disk-type laser gain medium is optimized, whereby a laser oscillation mode of the laser beam 16 outputted from the output mirror 15 to the outside can be limited to the low order Laguerre-Gaussian mode(s), and thereby, it becomes possible to output the laser beam of excellent beam quality.

Second Embodiment

Optically Pumped Disk-Type Solid State Laser System

FIG. 6 shows also an outline configuration of the optically pumped disk-type solid state laser system according to a second embodiment of the present invention. The optically pumped disk-type solid state laser system of the present embodiment further has, in order to make the optically pumped disk-type solid state laser resonator of the first embodiment stably output the laser beam 16, an unillustrated semiconductor laser oscillation device for making the semiconductor laser oscillate as the external excitation light 18, a semiconductor laser incident optical system (lens 10) for making the semiconductor laser light enter the thin film disk-type laser gain material 17, and a heat sink 12 for continuously and stably cooling the thin film disk-type laser gain material 17 whose temperature is increased by laser oscillation. The heat sink 12 is a heat-exhausting mechanism that is thermally joined together to a surface opposite to the disk surface to which the external excitation light 18 is made to enter and inside which a heat pipe 11 is arranged. By a cooling medium flowing in the heat pipe 11, heat that is transferred from the thin film disk-type laser gain material 17 to the heat sink 12 is exhausted to the outside.

In the present embodiment, the optically pumped disk-type solid state laser system may be equipped with a solar light incident optical system for making solar light enter into the gain material as the external excitation light 18, instead of the semiconductor laser oscillation device and the semiconductor laser incident optical system for making the semiconductor laser light enter the gain material. By using solar light in the present embodiment, laser beam output that is characteristic in higher output power and higher quality than those of the rod-type solar light pumped laser being currently assumed as a solar light pumped solid state laser can be realized.

The present embodiment can realize the optically pumped disk-type solid state laser system capable of outputting a laser beam stable for a longer time in addition to operations and effects in the first embodiment. Moreover, in the present embodiment, a highly reliable optically pumped disk-type solid state laser system can be realized by stable cooling of the thin film disk-type laser gain material 17 with the use of the heat sink 12.

This application is related to Japanese Laid-Open Patent Application JP-P2007-59591A. The disclosure of that application is incorporated herein by reference.

What is claimed is:

1. An optically pumped disk type solid state laser oscillator comprising:
    a thin film laser gain medium formed in a cylindrical form and configured to generate a stimulated emission in response to an inputted excitation light and having a through-hole in a central area of the thin film laser gain medium and being formed in a cylindrical form;
    a ring mirror having a ring form whose central axis is same to a central axis of the thin film laser gain medium and configured to have a mirror surface opposing to a side surface of the thin film laser gain medium;
    a conical mirror whose central axis is same to the central axis of the thin film laser gain medium and arranged in the through-hole; and
    an output mirror arranged on an extension of the central axis and whose mirror surface and the conical mirror are opposingly faced to each other,
    wherein the output mirror has a through hole which is tube shape whose central axis is same to the central axis of the thin film laser gain medium as a coupling hole through which a laser light generated in the optically pumped disk type solid state laser oscillator is outputted.

2. An optically pumped disk type solid state laser oscillator comprising:
    a thin film laser gain medium formed in a cylindrical form and configured to generate a stimulated emission in response to an inputted excitation light and having a through-hole in a central area of the thin film laser gain medium and being formed in a cylindrical form;
    a ring mirror having a ring form whose central axis is same to a central axis of the thin film laser gain medium and configured to have a mirror surface opposing to a side surface of the thin film laser gain medium;
    a conical mirror whose central axis is same to the central axis of the thin film laser gain medium and arranged in the through-hole; and
    an output mirror arranged on an extension of the central axis and whose mirror surface and the conical mirror are opposingly faced to each other,
    wherein the output mirror is a convex mirror composing an unstable resonator, and a diameter of the convex mirror is smaller than a diameter of a beam of the stimulated emission reflected by the conical mirror and enters the convex mirror.

3. An optically pumped disk type solid state laser system comprising:
    a thin film laser gain medium formed in a cylindrical form and configured to generate a stimulated emission in response to an inputted excitation light and having a through-hole in a central area of the thin film laser gain medium and being formed in a cylindrical form;
    a ring mirror having a ring form whose central axis is same to a central axis of the thin film laser gain medium and configured to have a mirror surface opposing to a side surface of the thin film laser gain medium;
    a conical mirror whose central axis is same to the central axis of the thin film laser gain medium and arranged in the through-hole;
    an output mirror arranged on an extension of the central axis and whose mirror surface and the conical mirror are opposingly faced to each other;
    an incident optical system configured to introduce the excitation light into an incident surface of the thin film laser gain medium arranged at a same side of the thin film laser gain medium as the output mirror; and
    a heat sink thermally connected to a surface of the thin film laser gain medium opposite to the incident surface of the thin film laser gain medium.

4. The optically pumped disk type solid state laser system according to claim 3, further comprising:
    a semiconductor laser oscillating device configured to generate a semiconductor laser,
    wherein the incident optical system introduces the semiconductor laser generated by the semiconductor laser oscillating device to the incident surface as the excitation light.

5. The optically pumped disk type solid state laser system according to claim 3, wherein the incident optical system introduces sunlight into the incident surface as the excitation light.

6. An adjusting method of a laser oscillation mode of an optical disk type solid state laser oscillator, wherein the optical disk type solid state laser oscillator includes:
    a thin film laser gain medium formed in a cylindrical form and configured to generate a stimulated emission in response to an inputted excitation light and having a through-hole in a central area of the thin film laser gain medium and being formed in a cylindrical form;
    a ring mirror having a ring form whose central axis is same to a central axis of the thin film laser gain medium and configured to have a mirror surface opposing to a side surface of the thin film laser gain medium;
    a conical mirror whose central axis is same to the central axis of the thin film laser gain medium and arranged in the through-hole; and
    an output mirror arranged on an extension of the central axis and whose mirror surface and the conical mirror are opposingly faced to each other,
    the adjusting method comprising:
    changing a laser oscillation mode outputted from the output mirror, the changing of the laser oscillation mode including:
    changing a curvature of the ring mirror;
    changing a curvature of the conical mirror;
    changing a curvature of the output mirror; and
    changing a relative position of the conical mirror to the thin film laser gain medium in a direction of the central axis of the thin film laser gain medium.

* * * * *